US007787976B2

(12) United States Patent
Hung et al.

(10) Patent No.: US 7,787,976 B2
(45) Date of Patent: Aug. 31, 2010

(54) METHOD AND APPARATUS FOR ESTIMATING LENGTH OF AUDIO FILE

(75) Inventors: Hsien-Chung Hung, Minsyong Township, Chiayi County (TW); Hsien-Ming Tsai, Jiali Township, Tainan County (TW)

(73) Assignee: Quanta Computer Inc., Tao Yuan Shien (TW)

( * ) Notice: Subject to any disclaimer, the term of this patent is extended or adjusted under 35 U.S.C. 154(b) by 775 days.

(21) Appl. No.: 11/804,380

(22) Filed: May 17, 2007

(65) Prior Publication Data

US 2008/0039965 A1 Feb. 14, 2008

(30) Foreign Application Priority Data

Aug. 11, 2006 (TW) .............................. 95129681 A

(51) Int. Cl.
*G06F 17/00* (2006.01)

(52) U.S. Cl. ........................................................ 700/94

(58) Field of Classification Search .................. 700/94; 704/500-504

See application file for complete search history.

(56) References Cited

U.S. PATENT DOCUMENTS

2002/0031065 A1* 3/2002 Kajiyama et al. ........ 369/47.23
2003/0228131 A1* 12/2003 Miyazawa .................. 386/46
2006/0153524 A1* 7/2006 Damstra et al. ............... 386/83
2006/0206324 A1* 9/2006 Skilling et al. .............. 704/231
2007/0189128 A1* 8/2007 Chung ........................... 369/7

* cited by examiner

*Primary Examiner*—Andrew C Flanders
(74) *Attorney, Agent, or Firm*—Thomas, Kayden, Horstemeyer & Risley

(57) ABSTRACT

A method for estimating an audio length of an audio file in an audio player is provided. First, the method generates a predicted audio length based on the average bit rate of some selected audio frames in the audio file, and initializes an adjustable audio length by the predicted audio length. Then, in the process of playing each audio frame of the audio file, the method continuously calculates a latest reference audio length. If the variation between the latest reference audio length and the previous reference audio length is smaller than a predetermined threshold, the method will adjust the adjustable audio length according to the latest reference audio length. Finally, based on the ratio of the played data amount to the total data amount of the audio file, an estimated audio length can be acquired between the adjustable audio length and the reference audio length.

16 Claims, 7 Drawing Sheets

METHOD AND APPARATUS FOR ESTIMATING LENGTH OF AUDIO FILE

BACKGROUND OF THE INVENTION

1. Field of the Invention

The invention relates to a method and an apparatus applied to an audio player and, more particularly, to a method and an apparatus used to estimate the audio length of an audio file.

2. Description of the Prior Art

Most audio players have a function of seeking. In general, the seeking function of an audio player is to display a seeking bar which shows the audio length of an audio file and indicates the time that the audio file has been played as well. Therefore, a user can click any point of the seeking bar to appoint the time which the user desires to render the audio file. And, after the user clicks the seeking bar, the audio player will calculate the proportion of the clicked position to the entire seeking bar. Then, the audio player will multiply the audio length of the audio file by the proportion to figure out the point which the user desires to render the audio file. In this way, the position of the audio frame which the user desires to render the audio file can be found. In view of this, the audio player must obtain an estimated audio length of the audio file before seeking, and the deviation of the estimated audio length must not be huge. If the deviation of the estimated audio length is huge, the sought audio frame may not be come up to the point estimated by the user, and even the corresponding audio frame can not be located.

Nowadays, there are two main types of the compression for audio files: the constant bit rate and the variable bit rate. Compressing an audio file by the constant bit rate is to store audio data of fixed time with fixed data amount. Thus, the audio length of the audio file compressed by constant bit rate is easy to be estimated. However, in order to maintain audio quality, in the audio file compressed by variable bit rate, the storing bit rate is adjusted according to the characteristic of the audio data. Therefore, the amount of each audio data of fixed time may be different, and the audio length of the audio file compressed by the variable bit rate is also hard to be estimated.

In order to solve the problem that the audio length is hard to be estimated, certain audio files compressed by the variable bit rate will use tags (ex., ID3 and VBRI/Xing Header) to store the related data of audio length in the audio file beforehand. However, not all of the audio files provide the related data of audio length. Therefore, when playing the audio file without any related data of audio length, an audio player must calculate the audio length of the audio file by itself. And, the most accurate way to calculate audio length is to read the entire audio file, and then analyze the number of all audio frames to obtain the audio length. However, it needs a lot of time and system resource to read and analyze the entire audio file, using this method in a resource-limited embedded system is not practical at all.

There are also two main methods of estimating audio length nowadays: the predictive estimation and the real-time estimation. The predictive estimation method is to select several audio frames from the audio file before playing an audio file and use the average bit rate of these selected audio frames to estimate the audio length of the audio file which will be played soon. After the audio file is played, the audio player will fixedly display the audio length which is figured out at first, which will not be calculated or adjusted later. The advantage of predictive estimation method is that it is easy to practice, but its drawback is that the estimated result is not accurate. Due to the difference between the average bit rate of the selected audio frames and the average bit rate of the entire audio file, the audio length calculated by the predictive estimation method may be very different from the practical audio length of the audio file.

The real-time estimation method is to continuously calculate the average bit rate of the played parts in the process of playing an audio file, and constantly update the displayed audio length according to this average bit rate. The advantage of the real-time estimation method is that the estimated audio length will be closer to the correct audio length in accordance with the increase of playing audio frames, yet the drawback is that the estimated audio length of the audio played at the beginning may be very different from the correct audio length of the played audio. For example, if the average bit rates of the beginning audio frames of a certain audio file are lower, then the audio length estimated by the real-time estimation method in the beginning will be much larger than the correct audio length, and the estimated audio length will slowly converge to the correct audio length of the audio file afterwards.

From the above mentioned, it is known that either the predictive estimation method or the real-time estimation method has its own drawback, which is not an ideal way to estimate audio length.

SUMMARY OF THE INVENTION

The scope of the invention is to provide a method for an audio player to estimate a more accurate audio length before seeking. This method combines the above mentioned predictive estimation method and real-time estimation method. In the beginning of playing an audio file, the audio length estimated by the predictive estimation method is provided, and then the audio length is adjusted to the audio length estimated by the real-time estimation method in the process of playing the audio file.

From a file system, the total data amount ($S_{total}$) of the audio file can be known. At first, the predictive estimation method is used to calculate a predicted audio length $L_0$ in advance. Afterward, when the audio player of the invention has already played the audio file to the ith audio frame (assume the audio file includes N audio frames, and i is an integer index ranging from 1 to N), the played data amount can be added up as $S_{played}(i)$, and the time of the played audio length can be added up as $T_{played}(i)$. The main scope of the invention is to calculate the estimated audio length $L_E(i)$ of the ith audio frame according to the above information.

In an estimating method of a preferred embodiment according to the invention, the predictive estimation method is used to calculate a predicted audio length $L_0$ before playing the audio file, and to assume an initial adjustable audio length $L_A(0)$ equal to $L_0$. Afterward, a procedure is performed after the ith audio frame is played. First, the procedure uses real-time estimation method to calculate a reference audio length $L_R(i)$ of the ith audio frame according to $S_{total}$, $S_{played}(i)$ and $T_{played}(i)$. Then, a variation proportion of the ith audio frame $R(i)$ is calculated according to $L_R(i)$ and $L_R(i-1)$. It is judged whether $L_R(i)$ is stable by confirming whether $R(i)$ is smaller than a predetermined threshold. If it is stable, then the adjustable audio length of the ith audio frame $L_A(i)$ is calculated referring to $L_R(i)$ and $L_A(i-1)$; if not, $L_A(i)=L_A(i-1)$ is maintained. Finally, according to $L_A(i)$ and $L_R(i)$, an estimated audio length of the ith audio frame $L_E(i)$ is generated file to the entire audio file $S_{played}(i)/S_{total}$ as a weight to feedback and output when enquired.

An estimating apparatus of another preferred embodiment according to the invention includes a processor and a memory. The memory is used to store a software program code and an audio file; moreover, it can temporarily save audio length data. The processor performs the software program code stored in the memory device. The procedures of the software program code include firstly calculating a predicted audio length $L_0$ by using the predictive estimation method, and then using the above mentioned real-time estimation method to generate an estimated audio length $L_E$ within each audio frame; and eventually, saving the estimated audio length in a memory device to provide feedback and output when enquired.

The advantage and spirit of the invention may be understood by the following recitations together with the appended drawings.

BRIEF DESCRIPTION OF THE APPENDED DRAWINGS

DETAILED DESCRIPTION OF THE INVENTION

A scope of the invention is to provide a method for an audio player to estimate a more accurate audio length before seeking. This method combines the above mentioned predictive estimation method and real-time estimation method. In the beginning of playing an audio file, the audio length estimated by the predictive estimation method is provided, and then the audio length is adjusted to the audio length estimated by the real-time estimation method in the process of playing the audio file.

From a file system relative to the audio file, the total data amount ($S_{total}$) of the audio file can be known. At first, the predictive estimation method is used to calculate a predicted audio length $L_0$ in advance. Afterward, when the audio player of the invention has already played the audio file to the ith audio frame (assume the audio file includes N audio frames, and i is an integer index ranging from 1 to N), the played data amount can be added up as $S_{played}$(i), and the time of the played audio length can be added up as $T_{played}$(i). The main scope of the invention is to calculate the estimated audio length $L_E$(i) of the ith audio frame according to the above information.

Figure 1:
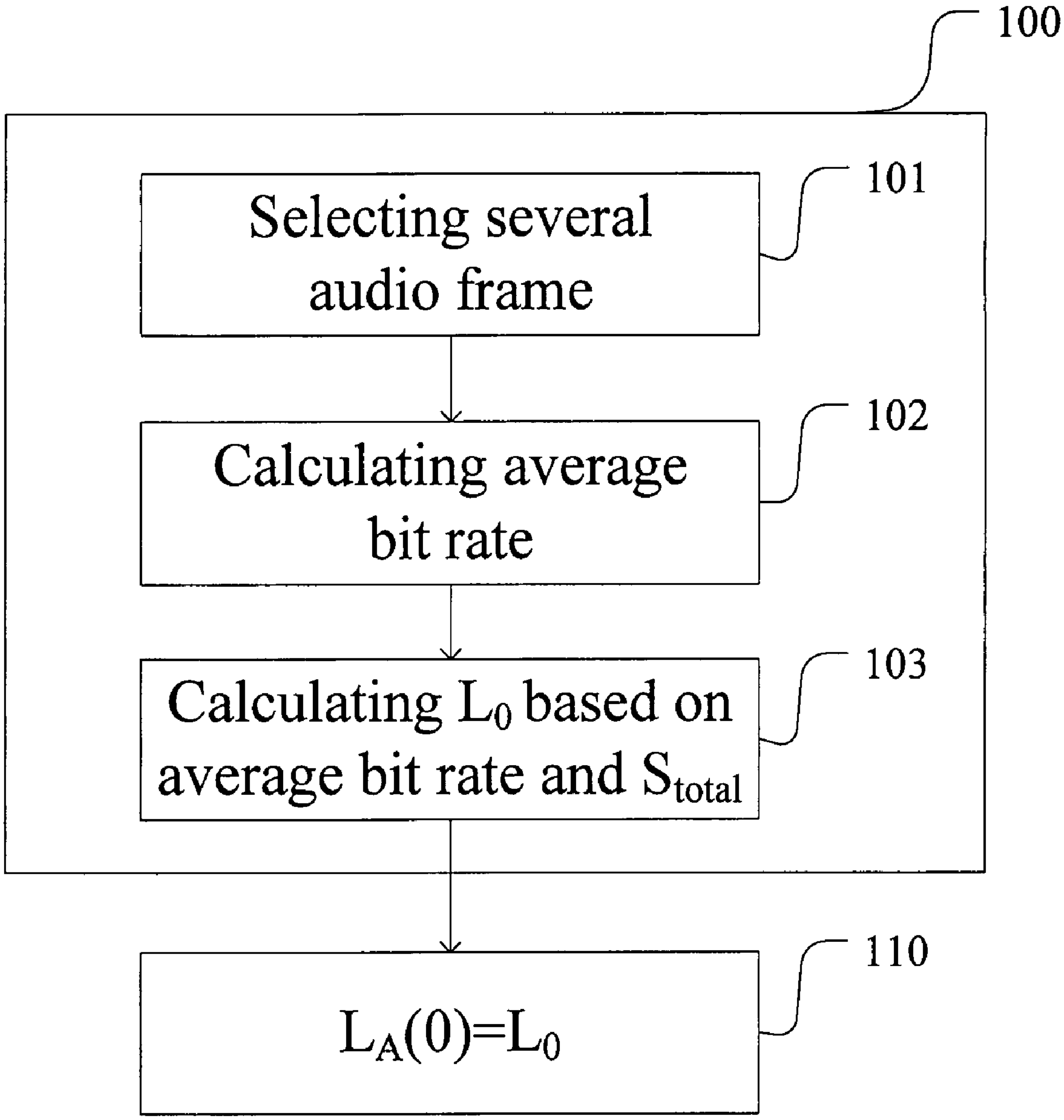
FIG. 1 is a flowchart of using the predictive estimation method to calculate the predicted audio length $L_0$ before the audio file being played according to the invention.

FIG. 1 is a flowchart of using the predictive estimation method to calculate a predicted audio length $L_0$ before the audio file is played according to the invention. Step 100 is to use the predictive estimation method of prior art to calculate a predicted audio length $L_0$. In practical applications, at first, step 101 is to select at least one audio frame as the sample audio frames from the N audio frames. Then, step 102 is to calculate the average bit rate of all sample audio frames. Step 103 is to divide the total data amount $S_{total}$ of the audio file by the average bit rate obtained in step 102 to get the predicted audio length $L_0$. Finally, step 110 is to set up an adjustable audio length $L_A(0)$ equal to $L_0$.

Figure 2:
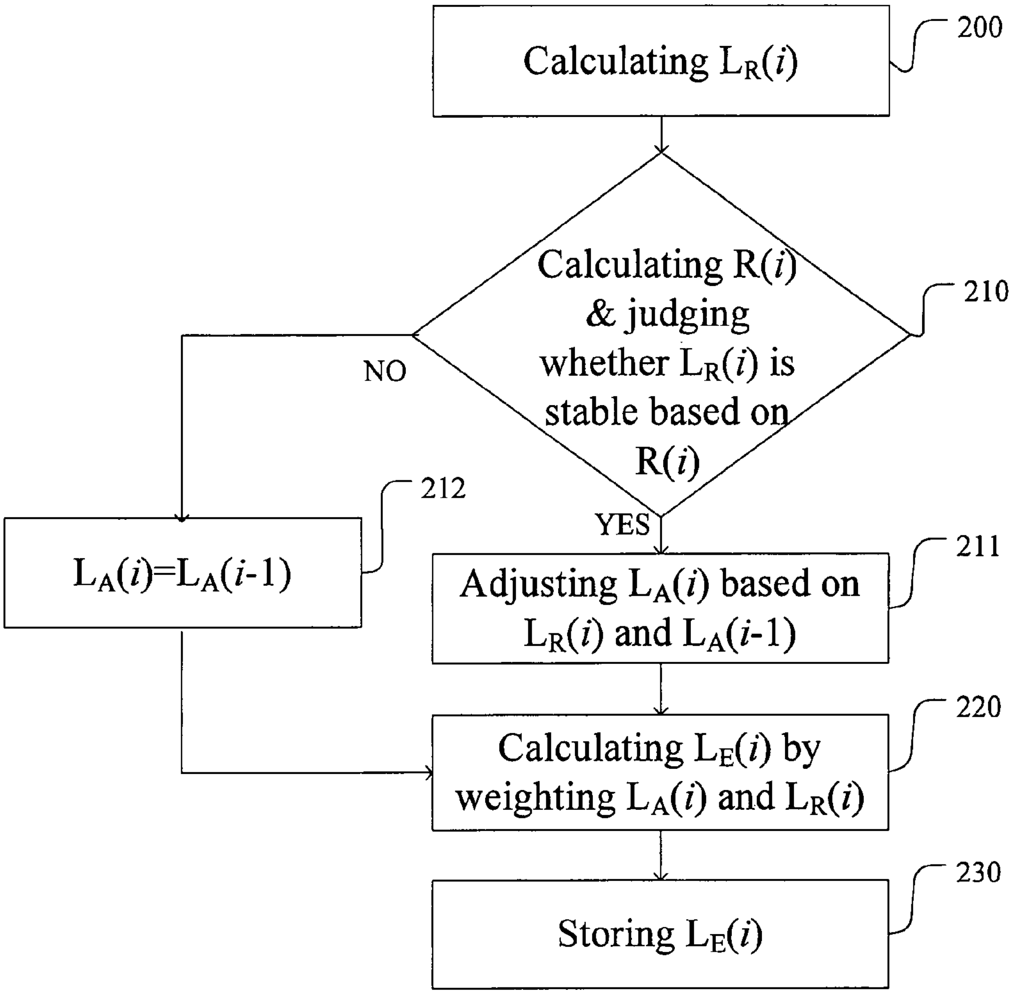
FIG. 2 is a flowchart of calculating an estimated audio length $L_E$(i) when the ith audio frame is played according to the invention.

FIG. 2 is a flowchart of calculating an estimated audio length $L_E$(i) when the ith audio frame is played according to the invention. The estimating method is to perform a procedure when the ith audio frame of the audio file played. In step 200, the reference audio length $L_R$(i) of the ith audio frame is calculated by using the real-time estimation method. In practical applications, according to the method and apparatus of the invention, $L_R$(i) can be calculated according to a first equation represented as:

$$L_R(i)=[S_{total}/S_{played}(i)]*T_{played}(i), \quad \text{(Equation 1)}$$

wherein $S_{total}$ is the total data amount of the audio file, $S_{played}$(i) is the sum of data amount of the audio file from the first audio frame to the ith audio frame, $T_{played}$(i) is the time interval between the time that the audio file is started to be played and the time that the ith audio frame is played.

Step 210 is to calculate the variation ratio of the ith audio frame R(i) according to a second equation and judge whether $L_R$(i) is stable according to whether the variation ratio is smaller than a predetermined threshold. The second equation can be represented as:

$$R(i)=\text{abs}[L_R(i)-L_R(i-1)]/L_R(i), \quad \text{(Equation 2)}$$

wherein $L_R(0)$ is set as 0.

The variation ratio R(i) represents the variation degree between the reference audio length of the ith audio frame $L_R$(i) and the reference audio length of the (i−1)th audio frame $L_R$(i−1). If R(i) is too large, larger than the predetermined threshold, it means that the average bit rate of the audio file is not stable yet, or compared to the bit rate of other audio frames, the bit rate of the ith audio frame has huge variation. The threshold can be determined according to experiment results.

If the judging result of step 210 is YES, it means that the average bit rate of the audio file has already approached the stability. Step 211 is to calculate the adjustable audio length of the ith audio frame $L_A$(i) according to a third equation represented as:

$$L_A(i)=L_A(i-1)*(1-P)+L_R(i)*P, \quad \text{(Equation 3)}$$

wherein P is a predetermined constant, and $0<P<1$. This constant can be determined according to experiment results.

As shown in Equation 3, when the average bit rate of the audio file has already approached the stability, the estimating method of the invention is to combine $L_A$(i−1) and the newest reference audio length $L_R$(i) with a fixed proportion to obtain an adjustable audio length of the ith audio frame $L_A$(i). This will make $L_A$(i) gradually approach the stable reference audio length.

If the judging result of step 210 is NO, then step 212 is to calculate the adjustable audio length of the ith audio frame $L_A$(i) according to a fourth equation represented as:

$$L_A(i)=L_A(i-1), \quad \text{(Equation 4)}$$

As shown in Equation 4, because the average bit rate of the audio file is not stable yet, according to the estimating method of the invention, $L_A$(i) is not adjusted immediately based on the newest reference audio length $L_R$(i), but equals to the former adjustable audio length $L_A(i-1)$. In this way, the adjustable audio length can avoid generating huge variation with the temporary bit rate.

In practical conditions, the last few audio frames of certain audio files are silence audio frames. Because the bit rate of these silence audio frames is much smaller than the average bit rate, it induces that the average bit rate drops immediately. Thus, the reference audio length $L_R(i)$ will be increased immediately. However, the adjustable audio length $L_A(i)$ will not be increased immediately following the reference audio length $L_R(i)$. This phenomenon causes that the adjustable audio length $L_A(i)$ does not be equal to the correct audio length when the last audio frame is played. According to the estimating method of the invention, the above mentioned problems will be solved by step 220.

Step 220 is to calculate the estimated audio length of the ith audio frame $L_E(i)$ which is displayed by the audio player at last according to a fifth equation represented as:

$$L_E(i)=L_A(i)^*(1-W)+L_R(i)^*W, \quad \text{(Equation 5)}$$

wherein $W=[S_{played}(i)/S_{total}]$, namely the proportion of data amount of the part which has already been played to the entire audio file.

The Nth estimated audio length $L_E(N)$ calculated from Equation 5 must be equal to $L_R(N)$, that is to say, the Nth estimated audio length is assumed to converge to the correct audio length of the audio file.

Finally, in step 230, the ith estimated audio length $L_E(i)$ calculated from step 220 is stored for further feedback and output when the seeking function is enquired.

Figure 3A:
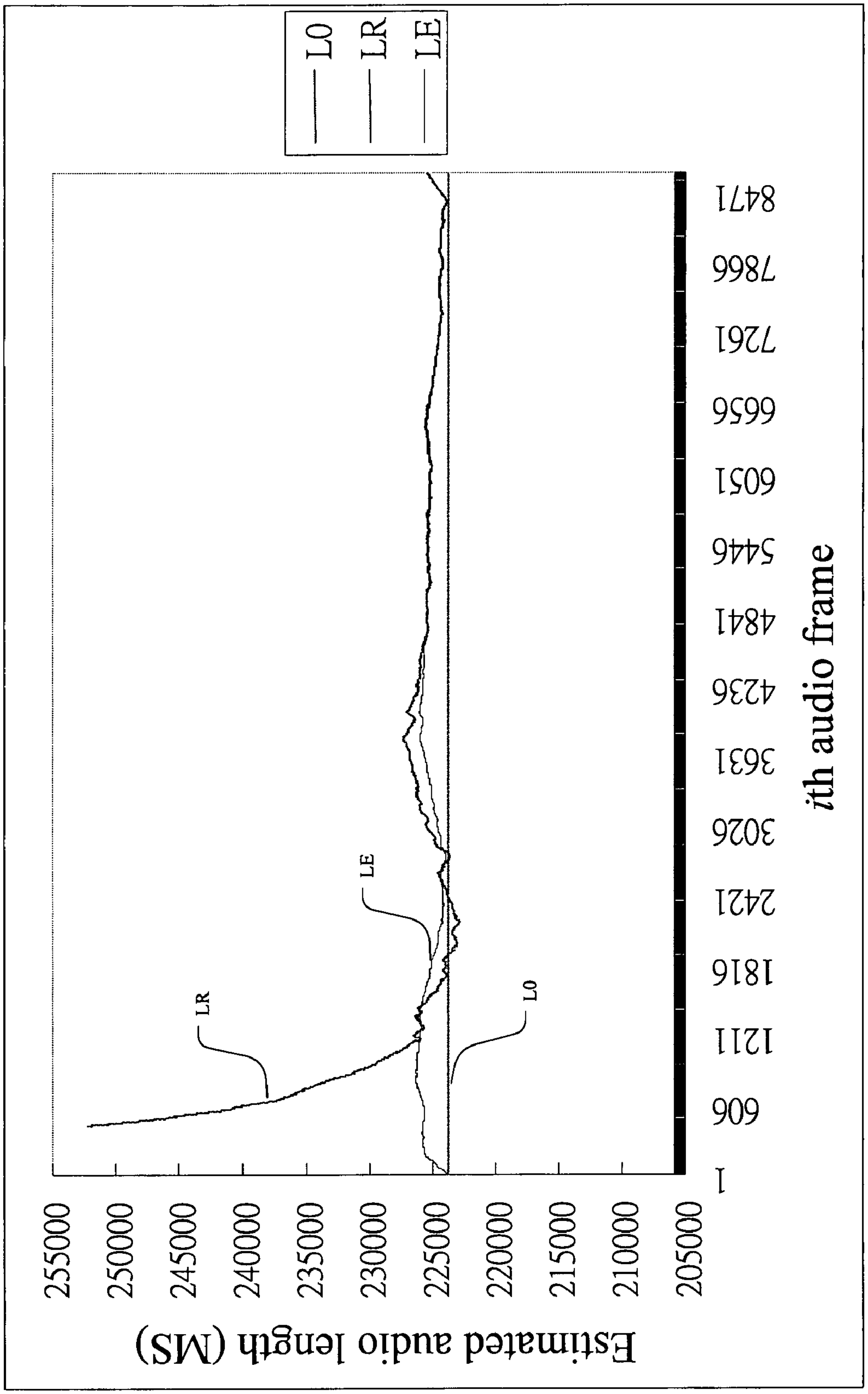
FIG. 3A shows an example of an adjustable bit rate audio file with the increase of the played audio frames to compare the calculated audio length from the predictive estimation method ($L_0$), the real-time estimation method ($L_R$), and the invention ($L_E$) respectively.
Figure 3B:
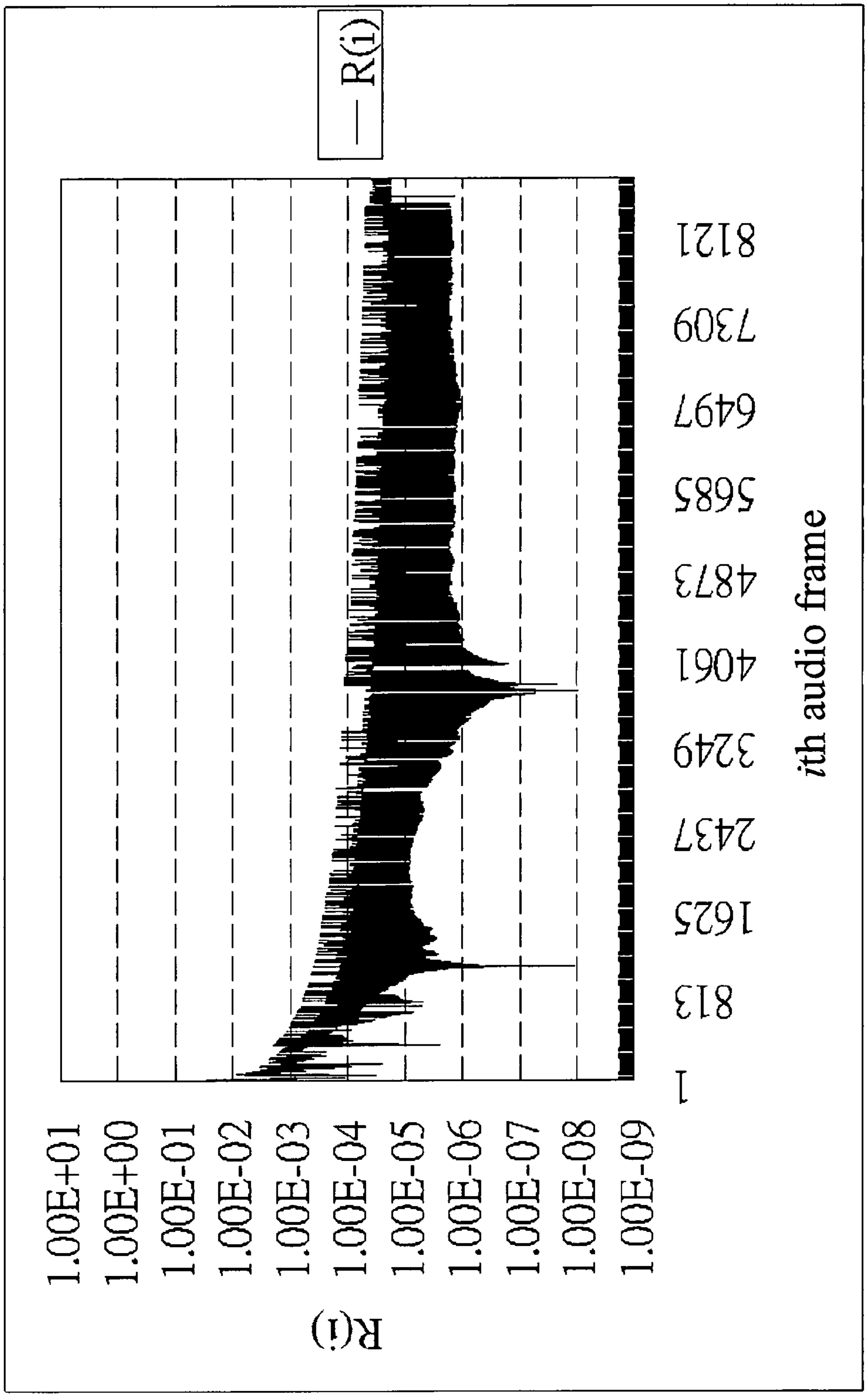
FIG. 3B shows the variation proportion of the ith audio frame R(i) in the embodiment of FIG. 3A with the method of the invention.

FIG. 3A shows an example of an adjustable bit rate audio file with the increase of the played audio frames to compare the calculated audio length from the predictive estimation method ($L_0$), the real-time estimation method ($L_R$), and the invention ($L_E$) respectively. In FIG. 3A, the calculated result of the predictive estimation method ($L_0$) has a deviation from the correct audio length. Moreover, the calculated result of the real-time estimation method ($L_R$) induces a huge deviation at the beginning of playing. Thus, the invention is to provide a method that can estimate a more stable audio length, which is getting more and more accurate. FIG. 3B shows the variation proportion of the ith audio frame R(i) in the embodiment of FIG. 3A in the way of the invention. In FIG. 3B, if R(i) is larger than a threshold (ex., 0.00003), then it means that the average bit rate of the audio frame is not stable yet.

Figure 4:
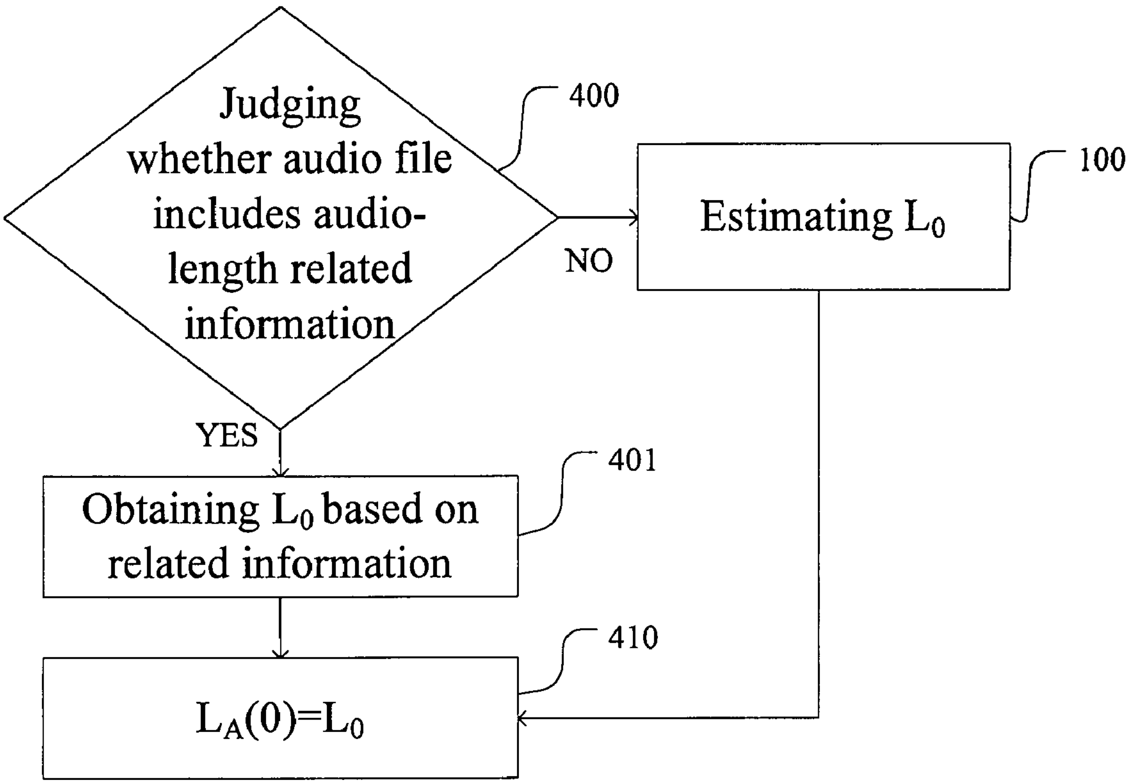
FIG. 4 is a flowchart of directly obtaining a predicted audio length $L_0$ based on the file header information before playing the audio file according to the invention.

According to the invention, FIG. 4 is a flowchart of directly obtaining an estimated audio length $L_0$ based on a file header information before playing the audio file. Compared to the method of FIG. 1, the following steps are added to the following procedures. First, whether the file header information o the related information of the audio length of the audio file (ex., ID3 or VBRI/Xing Header information) is judged in step 400. If the judging result of step 400 is YES, then step 401 is performed to directly obtain the predicted audio length $L_0$. If the judging result of step 400 is NO, then step 100 is performed to obtain the predicted audio length $L_0$ by using the predictive estimation method of FIG. 1.

Figure 5:
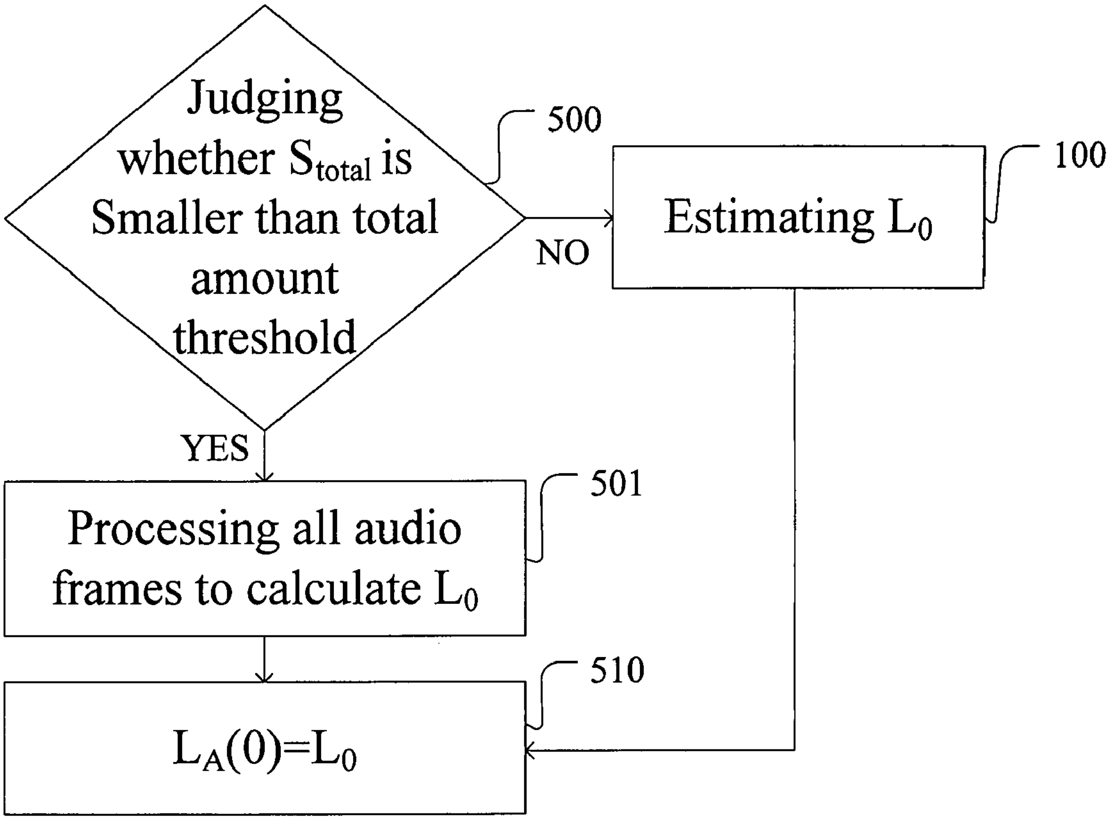
FIG. 5 is a flowchart of directly calculating a predicted audio length $L_0$ based on the file size before playing the audio file according to the invention.

FIG. 5 is a flowchart of directly calculating a predicted audio length $L_0$ based on the file size before playing the audio file according to the invention. Compared to the method of FIG. 1, the following steps are also added to the method of the invention before performing all the procedures. First, step 500 is to judge whether the total data amount of the audio file $S_{total}$ is smaller than a predetermined total amount threshold. If the judging result of step 500 is YES, then step 501 is performed to directly read and calculate the sum of all the audio frames in the audio file to obtain the predicted audio length information $L_0$. If the judging result of step 500 is NO, then step 100 is performed by using the predictive estimation method of FIG. 1. Because the accurate audio length is already obtained directly in the embodiment, it is not necessary to use the real-time estimation method to calculate the estimated audio length in each of audio frames.

Figure 6:
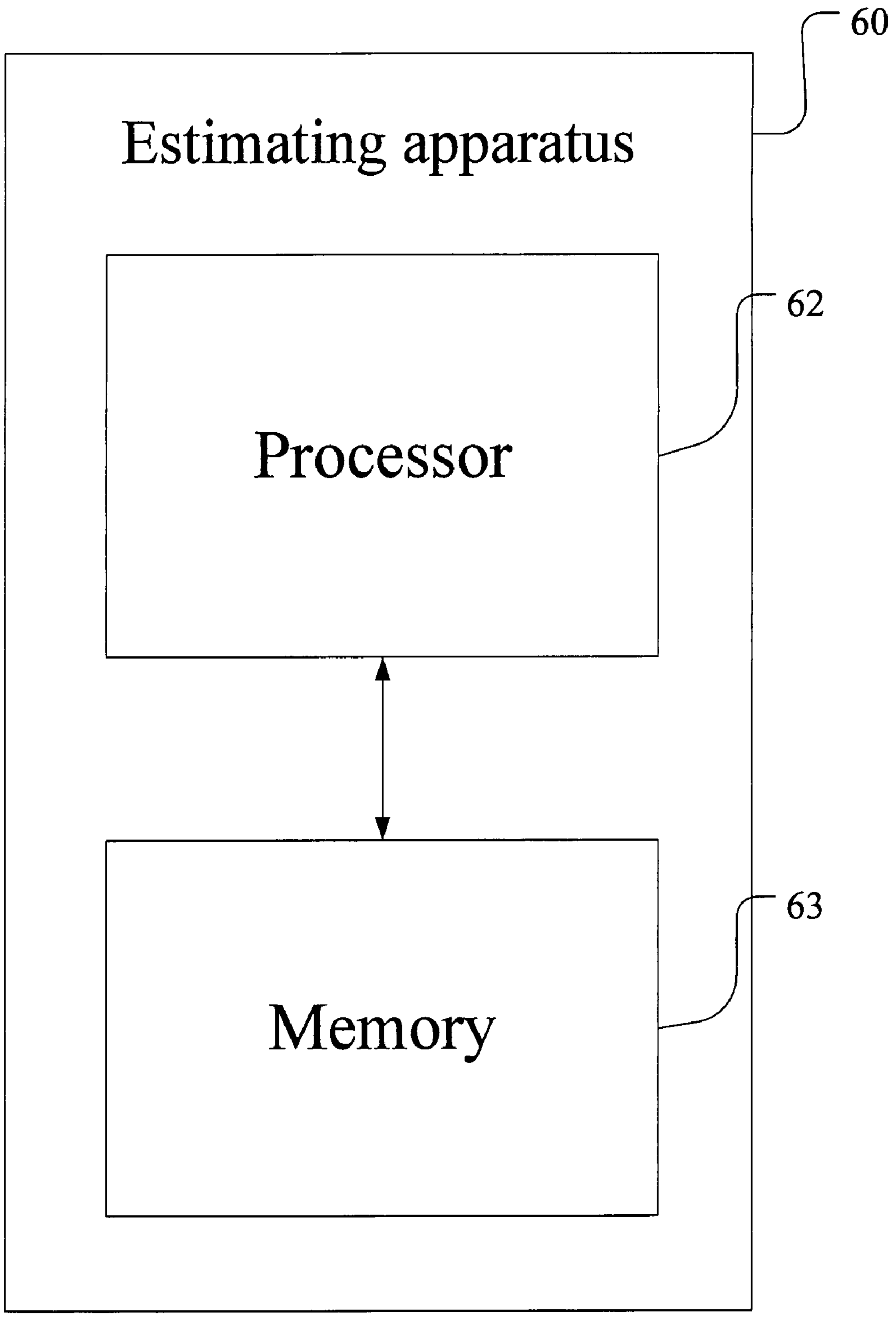
FIG. 6 is the block diagram of the estimating apparatus according to the invention.

FIG. 6 is the block diagram of the estimating apparatus according to the invention. The estimating apparatus 60 includes a processor 62 and a memory 63. The memory 63 is used to store a software program code and an audio file; moreover, it can temporarily save audio length data. The processor 62 performs the software program code stored in the memory. The software program code includes the following steps:

(1) before the audio file is played, calculating a predicted audio length $L_0$ and setting an initial adjustable audio length $L_A(0)$ equal to the predicted audio length $L_0$; and (2) when the ith audio frame of the audio file being played, performing the following sub-steps:

(2a) calculating a reference audio length $L_R(i)$ of the ith audio frame;

(2b) calculating a variation ratio R(i) of the ith audio frame according to $L_R(i)$ and $L_R(i-1)$, and judging whether R(i) is smaller than a predetermined threshold; if YES, performing the sub-step (2c); if NO, performing the sub-step (2d);

(2c) calculating an adjustable audio length $L_A(i)$ of the ith audio frame according to $L_A(i-1)$ and $L_R(i)$, and performing the sub-step (2e);

(2d) setting an adjustable audio length $L_A(i)$ of the ith audio frame equal to $L_A(i-1)$, and performing the sub-step (2e);

(2e) calculating the estimated audio length $L_E(i)$ of the ith audio frame according to $L_A(i)$, $L_R(i)$, a cumulative played data amount $S_{played}(i)$, and a total data amount of the audio file $S_{total.}$;

(2f) storing the estimated audio length of the ith audio frame $L_E(i)$ in the memory 63, and feeding back and outputting it when the seeking function is enquired.

It should be noticed that the predictive estimation method can be used to calculate the predicted audio length $L_0$ in the step (1) of the software program code performed by the processor 62, and the predictive estimation method includes the following sub-steps:

(1a) selecting a plurality of audio frames from the audio file;

(1b) calculating an average bit rate of the plurality of selected audio frames; and (1c) dividing the total data amount $S_{total}$ of the audio file by the average bit rate to obtain the predicted audio length $L_0$.

In practical applications, the predicted audio length $L_0$ can be directly obtained according to the file header information in the step (1) of the software program code performed by the processor 62. This method includes the following sub-steps:

(3a) judging whether the file header information of audio file includes audio length related information; if YES, performing the sub-step (3b); if NO, performing the sub-steps (1a), (1b), and (1c) of the predictive estimation method;

(3b) obtaining the predicted audio length $L_0$ directly.

In practical applications, the predicted audio length $L_0$ can be directly calculated according to the audio file size in the step (1) of the software program code performed by the processor 62. This method includes the following sub-steps:

(4a) judging whether the total data amount $S_{total}$ of the audio file is smaller than a total amount threshold; if YES, performing the sub-step (4b); if NO, performing the sub-steps (1a), (1b), and (1c) of the predictive estimation method; and (4b) directly reading and calculating the sum of all audio frames in the audio file to obtain the predicted audio length information $L_0$.

The method and apparatus based on the invention can be used to various audio files coded by the way of audio frames, and it also can provide a stable estimated audio length which is getting more and more accurate. The probability of obtaining the audio frame which is not corresponding to the user-selected time point by the audio player or obtaining no audio frame corresponding to the user-selected time point can be reduced.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A method for estimating an audio length of an audio file, the audio file comprising N audio frames, N being a natural number, i being an integer index ranging from 1 to N, said method comprising the steps of:

(1) before the audio file is played, calculating a predicted audio length $L_0$ and setting an initial adjustable audio length $L_A(0)$ equal to the predicted audio length $L_0$; and (2) when the ith audio frame of the audio file is played, performing the following sub-steps:

(2a) calculating a reference audio length $L_R(i)$ of the ith audio frame;

(2b) calculating a variation ratio R(i) of the ith audio frame according to $L_R(i)$ and $L_R(i-1)$, judging whether R(i) is smaller than a predetermined threshold; if YES, performing the sub-step (2c); if NO, performing the sub-step (2d);

(2c) calculating an ith adjustable audio length $L_A(i)$ of the ith audio frame according to $L_R(i)$ and an (i−1)th adjustable audio length $L_A(i-1)$ of the (i−1)th audio frame in the audio file, performing the sub-step (2e);

(2d) setting an adjustable length $L_A(i)$ of the ith audio frame equal to an (i−1)th adjustable audio length $L_A(i-1)$ of the (i−1)th audio frame in the audio file, and performing the sub-step (2e);

(2e) calculating an estimated audio length $L_E(i)$ of the ith audio frame according to $L_A(i)$, $L_R(i)$, a cumulative played data amount $S_{played}(i)$, and a total data amount $S_{total}$ of the audio file; and (2f) saving the estimated audio length $L_E(i)$ of the ith audio frame.

2. The method of claim 1, wherein a prediction method is used to calculate the predicted audio length $L_0$ in the step (1), and the prediction method comprises the following sub-steps:

(1a) selecting a plurality of audio frames from the audio file;

(1b) calculating an average bit rate of the plurality of selected audio frames; and (1c) dividing the total data amount $S_{total}$ of the audio file by the average bit rate to obtain the predicted audio length $L_0$.

3. The method of claim 2, wherein the step (1) further comprises the following sub-steps:

(3a) judging whether a file header information of the audio file comprises an audio-length related information of the audio length; if YES, performing the sub-step (3b); if NO, performing the sub-steps (1a), (1b), and (1c); and (3b) obtaining the predicted audio length $L_0$ from the audio-length related information.

4. The method of claim 2, wherein the step (1) further comprises the following sub-steps:

(4a) judging whether the total data amount $S_{total}$ of the audio file is smaller than a total amount threshold; if YES, performing the sub-step (4b); if NO, performing the sub-steps (1a), (1b), and (1c); and (4b) reading and analyzing all audio frames in the audio file to obtain the predicted audio length $L_0$.

5. The method of claim 1, wherein in the sub-step (2a), the reference audio length $L_R(i)$ of the ith audio frame is calculated according to a first equation represented as:

$$L_R(i)=[S_{total}/S_{played}(i)]*T_{played}(i).$$

6. The method of claim 1, wherein in the sub-step (2b), the variation ratio R(i) of the ith audio frame is calculated according to a second equation represented as:

$$R(i)=\mathrm{abs}[L_R(i)-L_R(i-1)]/L_R(i).$$

7. The method of claim 1, wherein in the sub-step (2c), the adjustable audio length $L_A(i)$ of the ith audio frame is calculated according to a third equation represented as:

$$L_A(i)=L_A(i-1)*(1-P)+L_R(i)*P,$$

wherein P is a predetermined constant.

8. The method of claim 1, wherein in the sub-step (2e), the estimated audio length $L_E(i)$ of the ith audio frame is calculated according to a fifth equation represented as:

$$L_E(i)=L_A(i)*(1-W)+L_R(i)*W,$$

wherein $W=[S_{played}(i)/S_{total}]$.

9. An apparatus for estimating audio length in an audio player, comprising:

a memory for storing a software program code and an audio file, and for temporarily saving at least one audio length data, the audio file comprising N audio frames, N being a natural number, i being an integer index ranging from 1 to N; and a processor for executing the software program code stored in the memory, the software program code comprising the following steps:

(1) before the audio file is played, calculating a predicted audio length $L_0$ and setting an initial adjustable audio length $L_A(0)$ equal to the predicted audio length $L_0$; and (2) when the ith audio frame of the audio file is played, performing the following sub-steps:

(2a) calculating a reference audio length $L_R(i)$ of the ith audio frame;

(2b) calculating a variation ratio R(i) of the ith audio frame according to $L_R(i)$ and $L_R(i-1)$, judging whether R(i) is smaller than a predetermined threshold; if YES, performing the sub-step (2c); if NO, performing the sub-step (2d);

(2c) calculating an ith adjustable audio length $L_A(i)$ of the ith audio frame according to $L_R(i)$ and an (i−1)th adjustable audio length $L_A(i-1)$ of the (i−1)th audio frame in the audio file, performing the sub-step (2e);

(2d) setting an ith adjustable audio length $L_A(i)$ of the ith audio frame equal to an (i−1)th adjustable audio length $L_A(i-1)$ of the (i−1)th audio frame in the audio file, and performing the sub-step (2e);

(2e) calculating an estimated audio length $L_E(i)$ of the ith audio frame according to $L_A(i)$, $L_R(i)$, a cumulative played data amount $S_{played}(i)$, and a total data amount $S_{total}$ of the audio file; and (2f) saving the estimated audio length $L_E(i)$ of the ith audio frame.

10. The apparatus of claim 9, wherein a prediction method is used to calculate the predicted audio length $L_0$ in the step (1), and the prediction method comprises the following sub-steps:

(1a) selecting a plurality of audio frames from the audio file;

(1b) calculating an average bit rate of the plurality of selected audio frames; and (1c) dividing the total data amount $S_{total}$ of the audio file by the average bit rate to obtain the predicted audio length $L_0$.

11. The apparatus of claim 10, wherein the step (1) of the software program code performed by the processor further comprises the following sub-steps:

(3a) judging whether a file header information of the audio file comprises an audio-length related information; if YES, performing the sub-step (3b); if NO, performing the sub-steps (1a), (1b), and (1c); and (3b) obtaining the predicted audio length $L_0$ from the audio-length related information.

12. The method of claim 10, wherein the step (1) further comprises the following sub-steps:

(4a) judging whether the total data amount $S_{total}$ of the audio file is smaller than a total amount threshold; if YES, performing the sub-step (4b); if NO, performing the sub-steps (1a), (1b), and (1c); and (4b) reading and analyzing all the audio frames in the audio file to obtain the predicted audio length $L_0$.

13. The apparatus of claim 9, wherein the sub-step (2a) of the software program code performed by the processor calculates the reference length $L_R(i)$ of the ith audio frame according to a first equation represented as:

$$L_R(i)=[S_{total}/S_{played}(i)]*T_{played}(i).$$

14. The apparatus of claim 9, wherein the sub-step (2b) of the software program code performed by the processor calculates the variation ratio R(i) of the ith audio frame according to a second equation represented as:

$$R(i)=\text{abs}[L_R(i)-L_R(i-1)]/L_R(i).$$

15. The apparatus of claim 9, wherein the sub-step (2c) of the software program code performed by the processor calculates the adjustable audio length $L_A(i)$ of the ith audio frame according to a third equation represented as:

$$L_A(i)=L_A(i-1)*(1-P)+L_R(i)*P,$$

wherein P is a predetermined constant.

16. The apparatus of claim 9, wherein the sub-step (2e) of the software program code performed by the processor calculates the ith estimated length $L_E(i)$ according to a fifth equation represented as:

$$L_E(i)=L_A(i)*(1-W)+L_R(i)*W,$$

wherein $W=[S_{played}(i)/S_{total}]$.

* * * * *